US012088388B2

United States Patent
Sun et al.

(10) Patent No.: US 12,088,388 B2
(45) Date of Patent: Sep. 10, 2024

(54) TYPE II CSI PORT SELECTION CODEBOOK ENHANCEMENT WITH PARTIAL RECIPROCITY

(71) Applicant: Apple Inc., Cupertino, CA (US)

(72) Inventors: Haitong Sun, Irvine, CA (US); Weidong Yang, San Diego, CA (US); Yushu Zhang, Beijing (CN); Wei Zeng, San Diego, CA (US); Dawei Zhang, Saratoga, CA (US); Yuchul Kim, Santa Clara, CA (US); Hong He, Cupertino, CA (US); Chunhai Yao, Beijing (CN); Chunxuan Ye, San Diego, CA (US); Oghenekome Oteri, San Diego, CA (US); Ghaith N Hattab, Santa Clara, CA (US); Ismael Gutierrez Gonzalez, San Jose, CA (US); Jie Cui, San Jose, CA (US); Yang Tang, Cupertino, CA (US); Yeong-Sun Hwang, Germering (DE)

(73) Assignee: Apple Inc., Cupertino, CA (US)

( * ) Notice: Subject to any disclaimer, the term of this patent is extended or adjusted under 35 U.S.C. 154(b) by 277 days.

(21) Appl. No.: 17/439,179

(22) PCT Filed: Feb. 12, 2020

(86) PCT No.: PCT/CN2020/074901
§ 371 (c)(1),
(2) Date: Sep. 14, 2021

(87) PCT Pub. No.: WO2021/159316
PCT Pub. Date: Aug. 19, 2021

(65) Prior Publication Data
US 2022/0166486 A1   May 26, 2022

(51) Int. Cl.
*H04B 7/06* (2006.01)
*H04B 7/0417* (2017.01)

(52) U.S. Cl.
CPC ......... *H04B 7/0695* (2013.01); *H04B 7/0417* (2013.01); *H04B 7/0626* (2013.01); *H04B 7/063* (2013.01); *H04B 7/0639* (2013.01)

(58) Field of Classification Search
None
See application file for complete search history.

(56) References Cited

U.S. PATENT DOCUMENTS

| 2014/0192917 A1* | 7/2014 | Nam | H04B 7/0632 375/267 |
| 2017/0048037 A1 | 2/2017 | Yen et al. | |

(Continued)

FOREIGN PATENT DOCUMENTS

| WO | 2017025768 A1 | 2/2017 |
| WO | 2018127193 | 7/2018 |

OTHER PUBLICATIONS

International Search Report for PCT Patent Application No. PCT/CN2020/074901; Nov. 17, 2020.

(Continued)

*Primary Examiner* — Christine T Duong
(74) *Attorney, Agent, or Firm* — Kowert, Hood, Munyon, Rankin & Goetzel, P.C.

(57) ABSTRACT

A base station and wireless communication (UE) may perform type II CSI-RS port selection based at least on partial reciprocity between an uplink path and a downlink path between the base station and the UE. The base station may identify dominant signal paths between the base station and the UE, based on measurements performed during uplink transmissions, and may transmit, to the UE, corresponding information indicative of CSI measurement and reporting configuration that may include a single measurement (Continued)

resource or multiple measurement resources. Each measurement resource may include multiple-port CSI-RS ports. The UE may indicate, to the base station, selection of a measurement resource when multiple measurement resources are configured, and may also report layer independent or layer common selection of a subset of CSI-RS ports included in the indicated single measurement resource or multiple measurement resources. Further enhancements include frequency domain compression enhancement and dynamic codebook parameter reconfiguration.

20 Claims, 13 Drawing Sheets

(56) References Cited

U.S. PATENT DOCUMENTS

| | | | |
|---|---|---|---|
| 2018/0167116 A1 | 6/2018 | Rahman | |
| 2018/0220398 A1 | 8/2018 | John Wilson et al. | |
| 2018/0316407 A1 | 11/2018 | Rahman | |
| 2020/0052847 A1* | 2/2020 | Manolakos | H04L 5/0048 |

OTHER PUBLICATIONS

CATT "Remaining issues on Type II CSI enhancement"; 3GPP TSG RAN WG1 #98bis R1-1910348; Chongqing, China; Oct. 20, 2019.

Nokia et al. "Remaining Issue on Type II CSI Omission"; 3GPP TSG RAN WG1 Meeting #93 R1-1807187; Busan, Korea; May 25, 2018.

Nokia et al. "Remaining Issue on Type II CSI Omission"; 3GPP TSG RAN WG1 Meeting #92bis R1-1805106; Sanya, P.R. China; Apr. 20, 2018.

LG Electronics "Discussion on CSI acquisition framework"; 3GPP TSG RAN WG1 NR Ad-Hoc Meeting R1-1700476; Spokane, USA; Jan. 20, 2017.

5G NR in Bullets; www.5g-bullets.com; Feb. 9, 2020.

5G/NR—CSI RS Codebook; www.sharetechnote.com; Feb. 9, 2020.

Codebook Based Precoding; www.sciencedirect.com/topics/engineering/codebook-based-precoding; Jan. 24, 2020.

Extended European Search Report for EP Patent Application No. 20918344.1; 18 pages; Oct. 4, 2022.

LG Electronics "Discussion on CSI acquisition for reciprocity based operation"; 3GPP TSG RAN WG1 Meeting #90 R1-1713143; Prague, Czechia; 2 pages; Aug. 21, 2017.

Samsung "Discussions on non-codebook based CSI reporting"; 3GPP TSG RAN WG1 Meeting #82bis R1-155502; Malmo, Sweden; 3 pages; Oct. 5, 2015.

ZTE "CSI Enhancement for MU-MIMO Support"; 3GPP TSGRAN WG1 Meeting #95 R1-1813913; Spokane, USA; 11 pages; Nov. 12, 2018.

Office Action for Korean Patent Application No. 10-2022-7017676; Jul. 1, 2024.

Samsung "Port selection codebook for beam-formed CSI-RS," 3GPP TSG RAN WG1 #91 R1-1720296, Nov. 27, 2017.

Samsung "CSI enhancement for MU-MIMO," 3GPP TSG RAN WG1 #98bis, R1-1910490, Oct. 14, 2019.

* cited by examiner $$[w^\ell(1) \cdots w^\ell(N_3)] = \underbrace{\begin{pmatrix} v_0 \cdots v_{L-1} & \\ & v_0 \cdots v_{L-1} \end{pmatrix}}_{\substack{W_1 \\ \text{Spatial} \\ \text{Basis}}}_{2L} \underbrace{\begin{pmatrix} \tilde{c}_{0,1,\ell} & \cdots & \tilde{c}_{0,M,\ell} \\ \vdots & \ddots & \vdots \\ \tilde{c}_{2L-1,1,\ell} & \cdots & \tilde{c}_{2L-1,M,\ell} \end{pmatrix}}_{\substack{w_2^\ell \\ \text{Compressed} \\ \text{Combination} \\ \text{Coefficients}}}_{M} \underbrace{\begin{pmatrix} w_{f,1}^H \\ \vdots \\ w_{f,M}^H \end{pmatrix}}_{\substack{w_f^H \\ M \text{ Frequency} \\ \text{Basis}}}$$

$w^\ell$

*FIG. 8*

TYPE II CSI PORT SELECTION CODEBOOK ENHANCEMENT WITH PARTIAL RECIPROCITY

PRIORITY CLAIM INFORMATION

This application is a national stage application of International Application No. PCT/CN2020/074901, filed on Feb. 12, 2020, titled "Type II CSI Port Selection Codebook Enhancement with Partial Reciprocity", which is hereby incorporated by reference in its entirety.

FIELD OF THE INVENTION

The present application relates to wireless communications, and more particularly to Channel State Information (CSI) port selection codebook enhancement during wireless cellular communications, e.g. during 5G-NR communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (e.g., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices. The ever increasing number of features and functionality introduced in wireless communication devices creates a continuous need for improvement in both wireless communications and in wireless communication devices. In particular, it is important to ensure the accuracy of transmitted and received signals. The UEs, which may be mobile telephones or smart phones, portable gaming devices, communication systems/devices housed in or otherwise carried by transportation vehicles (e.g. cars, buses, trains, trucks, motorcycles, etc.), laptops, wearable devices, PDAs, tablets, portable Internet devices, music players, data storage devices, or other handheld devices, etc. are generally powered by a portable power supply, e.g., a battery and may have multiple radio interfaces that enable support of multiple radio access technologies (RATs) as defined by the various wireless communication standards (LTE, LTE-A, 5G-NR, Wi-Fi, BLUETOOTH™, etc.). There are ongoing efforts to achieve efficient use of wireless communication resources and thereby increase system and device operation efficiency.

Many wireless communication standards provide for the use of known signals (e.g., pilot or reference signals) for a variety of purposes, such as synchronization, measurements, equalization, control, etc. For example, in cellular wireless communications, reference signals (RS, for short) represent a special signal that exists only at the physical layer and is not used for delivering any specific information but to deliver a reference point for the downlink power. When a wireless communication device or mobile device (UE) attempts to determine downlink power (e.g. the power of the signal from a base station, such as eNB for LTE and gNB for NR), it measures the power of the reference signal and uses it to determine the downlink cell power. The reference signal also assists the receiver in demodulating the received signals. Since the reference signals include data known to both the transmitter and the receiver, the receiver may use the reference signal to determine/identify various characteristics of the communication channel. This is commonly referred to as 'Channel Estimation', which is a critical part of many high-end wireless communications such as LTE and 5G-NR communications. Known channel properties of a communication link in wireless communications are referred to as channel state information (CSI), which provides information indicative of the combined effects of, for example, scattering, fading, and power decay with distance. The CSI makes it possible to adapt transmissions to current channel conditions, which is crucial for achieving reliable communications with high data rates in multi-antenna systems.

Oftentimes multi-antenna systems use precoding for improved communications. Precoding is an extension of beamforming to support multi-stream (or multi-layer) transmissions for multi-antenna wireless communications and is used to control the differences in signal properties between the respective signals transmitted from multiple antennas by modifying the signal transmitted from each antenna according to a precoding matrix. In one sense, precoding may be considered a process of cross coupling the signals before transmission (in closed loop operation) to equalize the demodulated performance of the layers. The precoding matrix is generally selected from a codebook that defines multiple precoding matrix candidates, and a precoding matrix candidate is typically selected according to a desired performance level, based on any of a number of different factors, such as current system configuration, communication environment, and/or feedback information from the receiver, e.g. a mobile device (UE) receiving the transmitted signal(s).

The feedback information is used in selecting a precoding matrix candidate by defining the same codebook at both the transmitter (which may be a base station) and the receiver (which may be a mobile device, or UE), and using the feedback information from the receiver as an indication of a preferred precoding matrix. In such cases the feedback information includes what is referred to as a precoding matrix index (PMI), which can be based on properties of the signals received at the receiver. For example, the receiver may determine that a received signal has relatively low signal-to-noise ratio (SNR), and may accordingly transmit a PMI that would replace a current precoding matrix with a new precoding matrix to increase the signal-to-noise ratio (SNR).

The precoding matrices are based upon a specific set of assumed antenna configurations. These antenna configurations are specified by defining the number of rows and columns of cross polar antenna elements. For example, a smaller antenna may have 1 row and 2 columns of cross polar antenna elements, supporting a total of 4 transceivers. A larger antenna could have 4 rows and 4 columns of cross polar antenna elements, supporting a total of 32 transceivers. The set of antenna configurations does not restrict live network deployments from using other configurations. The maximum antenna configuration can support a specified total number (e.g. 32) of transceivers and is thus able to transmit the specified total number of CSI Reference Signals. An actual network deployment could use an active antenna with more transceivers, but for the purposes of CSI reporting it could transmit CSI Reference Signals using up to the specified total number of its transceivers.

Four solutions for PMI reporting have been defined thus far, Type I Single Panel, Type I Multi Panel, Type II Single Panel, and Type II Port Selection. Generally, the Type II solutions focus upon providing more detailed CSI for the purposes of Multi-User MIMO. They support a maximum rank of two (2) corresponding to a maximum of two (2) layers per UE. The maximum number of layers per cell is likely to be higher to allow multiple UEs to use 2×2 MIMO simultaneously while sharing a common Resource Block (RB) allocation. Type II reports are based upon selecting a set of beams and then specifying relative amplitudes and phases to generate a weighted combination of beams for each layer of transmission. The Type II Port Selection solution relies upon the base station having some advance information to allow beamforming of the CSI-RS transmissions. This advance information can originate from uplink (UL) measurements if channel reciprocity is available. Otherwise it can originate from beam management reports or it can use the wideband reports from a different PMI reporting solution (sometimes referred to as a "hybrid solution" when a combination of PMI reporting solutions is used). For more efficient and streamlined reporting by the UE, it may be beneficial to take advantage of even partial reciprocity that may exist between UL and DL transmissions.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, to use a Type II CSI port selection codebook with improved feedback taking advantage of partial reciprocity between uplink and downlink transmissions, e.g. during 5G-NR communications. Embodiments are further presented herein for wireless communication systems containing wireless communication devices (UEs) and/or base stations and access points (APs) communicating with each other within the wireless communication systems.

In the 3GPP Rel-15 specification, beamformed CSI-RS (channel state information-reference signal) exploits DL (downlink) and UL (uplink) channel reciprocity for Type II Port Selection. A total number of "X" CSI-RS ports may be selected, specifically X/2 ports for horizontal polarization (HPol) and X/2 ports for vertical polarization (VPol). A number "L" of CSI-RS ports may be selected out of X/2 CSI-RS port, with the first CSI-RS port selected every number "d" of ports. Then consecutive L ports may be selected with wraparound. The 3GPP Rel-16 specification discloses the same port selection design as Rel-15, while adding certain features. For example, when subband PMI (precoding matrix index) is configured, frequency domain DFT matrix can be used to compress the linear combination coefficient. For Type II port selection codebook, the gNB is assumed to precode the CSI-RS based on channel reciprocity. E.g., the DL channel may be estimated based on the UL channel. For FDD (frequency division duplex), exact channel reciprocity may not be present, especially when the duplexing distance is large. However, even for FDD, partial reciprocity may still exist. For example, the angle of arrival or departure may be similar between the DL and UL carrier, and the channel delay profile may be similar between the DL and UL carrier. In some embodiments, the Type II CSI port selection codebook may be enhanced by exploiting partial channel reciprocity, facilitating layer independent CSI-RS port selection, layer common CSI-RS port selection, frequency domain compression enhancement, and/or dynamic codebook parameter reconfiguration.

Pursuant to the above, based on an uplink (UL) Sounding Reference Signal (SRS) transmitted by the UE to the base station (e.g. to a gNB), the base station may estimate the UL channel and assume certain reciprocity of the channel to derive downlink (DL) channel properties such as preferred beam(s). The base station may then transmit the CSI-RS precode with the preferred beam(s). The CSI-RS may have multiple CSI-RS ports, and each port may be transmitted from the base station using a different beam, i.e. each CSI-RS port may correspond to a different beam over which the CSI-RS port is transmitted. The UE may indicate to the base station the preferred CSI-RS port(s) via CSI reporting, e.g. indicate the preferred beam in an implicit way.

In some embodiments, a UE may receive, from a base station, information indicative of channel state information (CSI) measurement and reporting configuration that may include a single measurement resource or multiple measurement resources. Each measurement resource may include multiple-port CSI-RS ports. The UE may indicate the selection of a measurement resource to the base station when multiple measurement resources are configured, and may report to the base station selection of a subset of CSI-RS ports included in the indicated single measurement resource or multiple measurement resources. The selection of the subset of CSI-RS ports may be performed independently for each layer of a multilayer transmission or it may be performed in common for each layer of the multilayer transmission.

In some embodiments, a base station may identify dominant signal paths between the base station and a device, based on channel estimates performed using uplink communications between the base station and the device. The base station may transmit preferred CSI-RS ports corresponding to the dominant signal paths to the device, with the CSI-RS ports transmitted over corresponding beams identified independently by the base station for each dominant signal path of the dominant signal paths.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 8 shows an exemplary diagram illustrating a codebook structure with compressed combination coefficients, for Type II CSI reporting;

Figure 1:
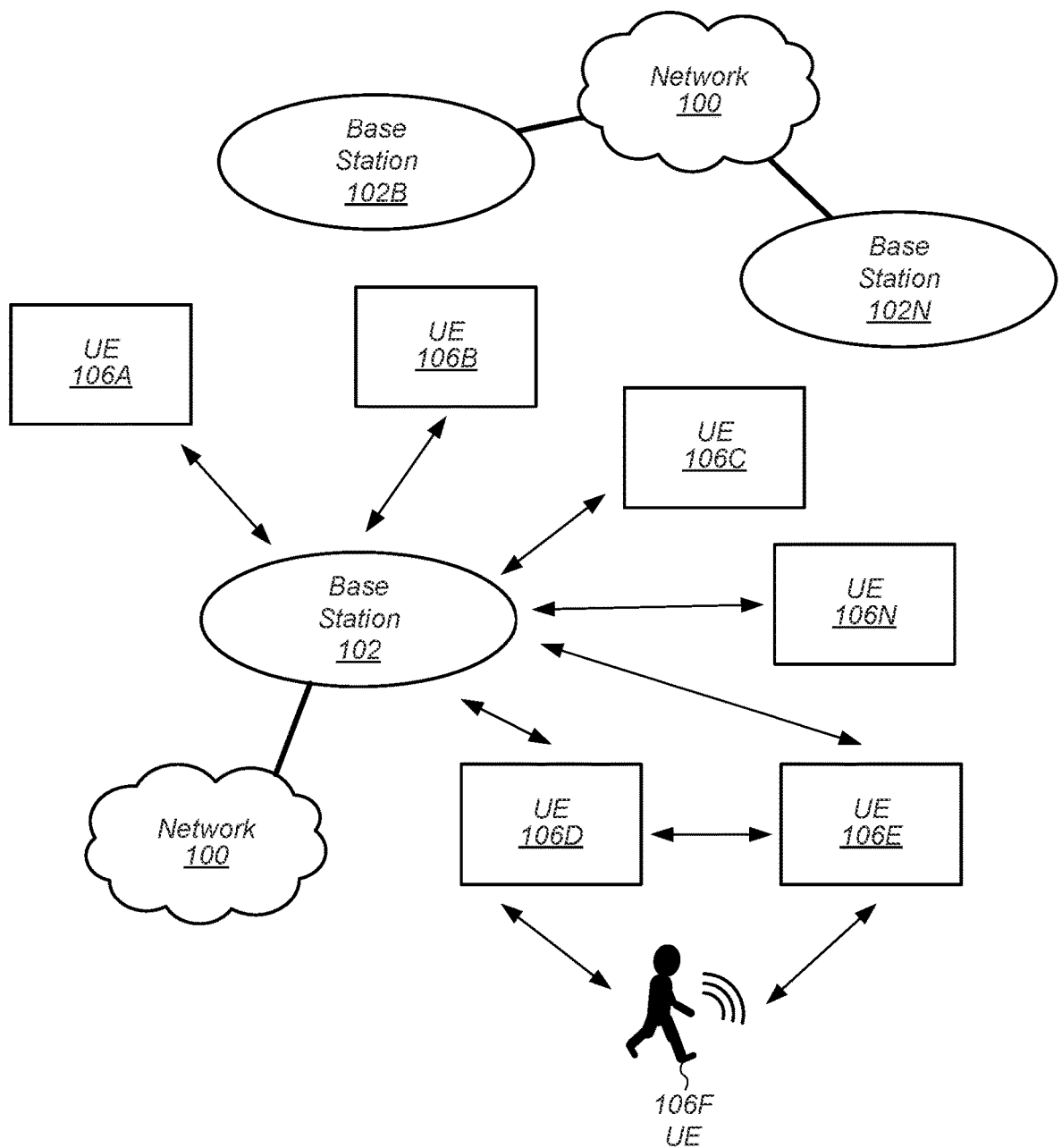
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
AS: Access Stratum
BS: Base Station
BSR: Buffer Size Report
BSSID: Basic Service Set Identifier
CBRS: Citizens Broadband Radio Service
CBSD: Citizens Broadband Radio Service Device
CBSR: Codebook Subset Restriction
CCA: Clear Channel Assessment
CMR: Change Mode Request
CS: Circuit Switched
CSI: Channel State Information
DL: Downlink (from BS to UE)
DSDS: Dual SIM Dual Standby
DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MIMO: Multiple-In Multiple-Out
MNO: Mobile Network Operator
MU: Multi-User
NAS: Non-Access Stratum
NB: Narrowband
OOS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PMI: Precoding Matrix Indicator
PSD: Power Spectral Density
PSS: Primary Synchronization Signal
PT: Payload Type
QBSS: Quality of Service Enhanced Basic Service Set
QI: Quality Indicator
RAN: Radio Access Network
RAT: Radio Access Technology
RF: Radio Frequency
ROHC: Robust Header Compression
RRC: Radio Resource Control
RS: Reference Signal
RTP: Real-time Transport Protocol
RTT: Round Trip Time
RX: Reception/Receive
SAS: Spectrum Allocation Server
SI: System Information
SID: System Identification Number
SIM: Subscriber Identity Module
SGW: Serving Gateway
SMB: Small/Medium Business
SRS: Sounding Reference Signal
SSS: Secondary Synchronization Signal
TBS: Transport Block Size
TCP: Transmission Control Protocol
TDD: Time Division Duplexing
TX: Transmission/Transmit
UE: User Equipment
UI: User Interface
UL: Uplink (from UE to BS)
UMTS: Universal Mobile Telecommunication System
USIM: UMTS Subscriber Identity Module
WB: Wideband Wi-Fi: Wireless Local Area Network (WLAN) RAT based on the Institute of Electrical and Electronics Engineers' (IEEE) 802.11 standards WLAN: Wireless LAN

TERMS

The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In cellular radio communications, signal and data transmissions may be organized according to designated time units of specific duration during which transmissions take place. For example, in LTE, transmissions are divided into radio frames, each radio frame being of equal (time) duration (e.g. each radio frame may be 10 ms). A radio frame in LTE may be further divided into ten subframes, each subframe being of equal duration, with the subframes designated as the smallest (minimum) scheduling unit, or the designated time unit for a transmission. Similarly, a smallest (or minimum) scheduling unit for 5G NR (or NR, for short) transmissions is referred to as a slot. Accordingly, as used herein, the term "slot" is used to reference a smallest (or minimum) scheduling time unit for the wireless communications being described for NR communications. However, as noted above, in different communication protocols such a scheduling time unit may be named differently, e.g. a "subframe" in LTE, etc.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
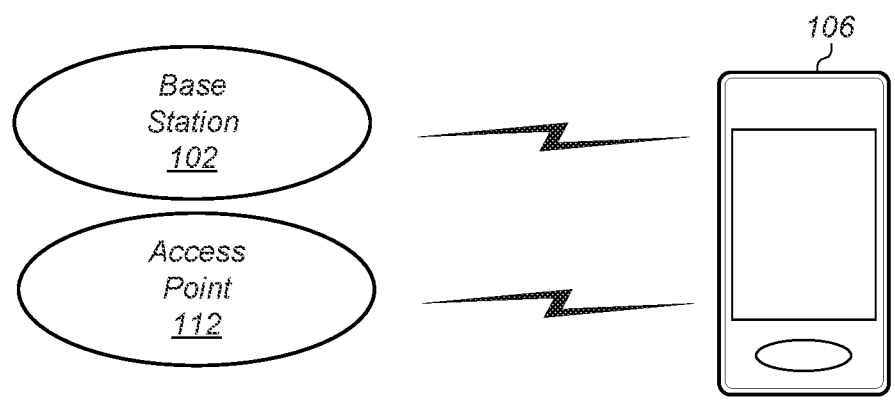
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base stations 102A through 102N, also collectively referred to as base station(s) 102 or base station 102. As shown in FIG. 1, base station 102A communicates over a transmission medium with one or more user devices 106A, 106B, etc., through 106N. Each of the user devices may be referred to herein as a "user equipment" (UE) or UE device. Thus, the user devices 106A through 106N are referred to as UEs or UE devices, and are also collectively referred to of UE(s) 106 or UE 106. Various ones of the UE devices may use an enhanced Type II CSI port selection codebook based at least on partial reciprocity, according to various embodiments disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station 102 may communicate with UEs that use an enhanced Type II CSI port selection codebook based at least on partial reciprocity, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Further aspects of vehicles communicating in network exemplified in FIG. 1 will be discussed below, for example in the context of vehicle-to-everything (V2X) communication such as the communications specified by 3GPP TS 22.185 V.14.3.0, among others.

FIG. 2 illustrates an exemplary user equipment 106 (e.g., one of the devices 106A through 106N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
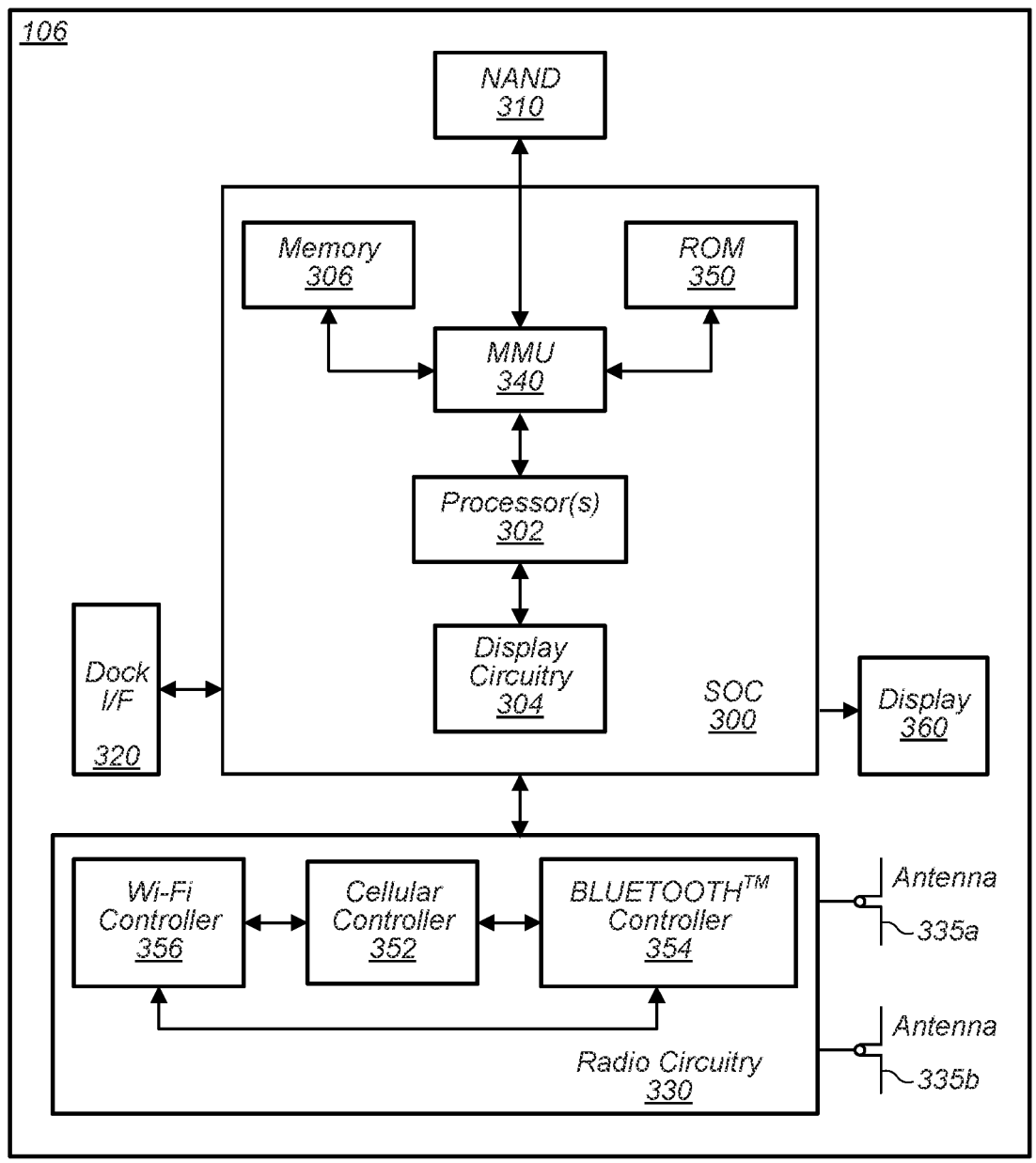
FIG. 3 illustrates an exemplary block diagram of a UE, according to some embodiments.

FIG. 3—Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to use an enhanced Type II CSI port selection codebook based at least on partial reciprocity during wireless communications, e.g. during 5G-NR communications, as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to use an enhanced Type II CSI port selection codebook based at least on partial reciprocity during wireless communications, e.g. during 5G-NR communications, according to various embodiments disclosed herein. Processor(s) 302 may also implement various other applications and/or end-user applications running on UE 106.

Figure 5:
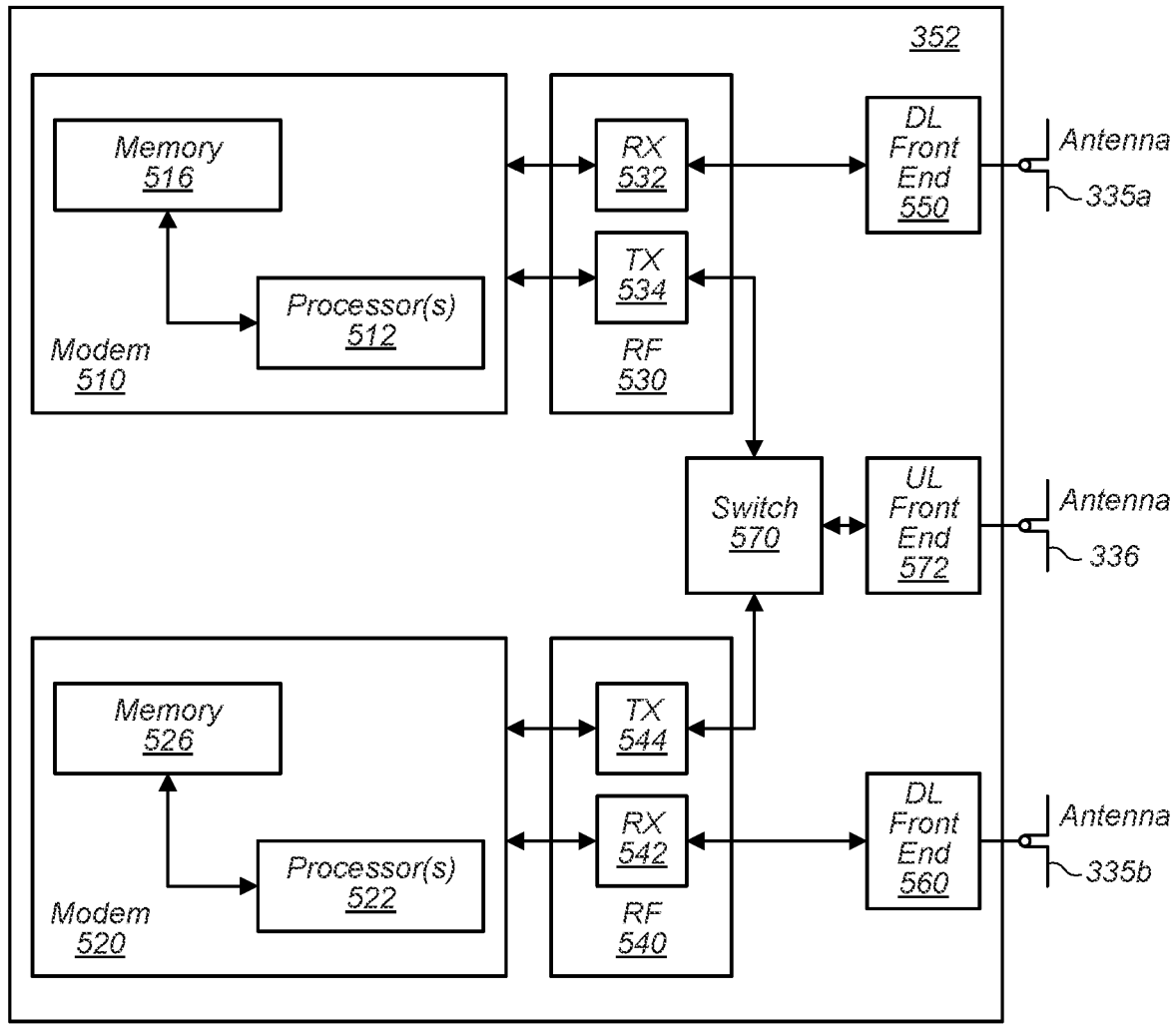
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
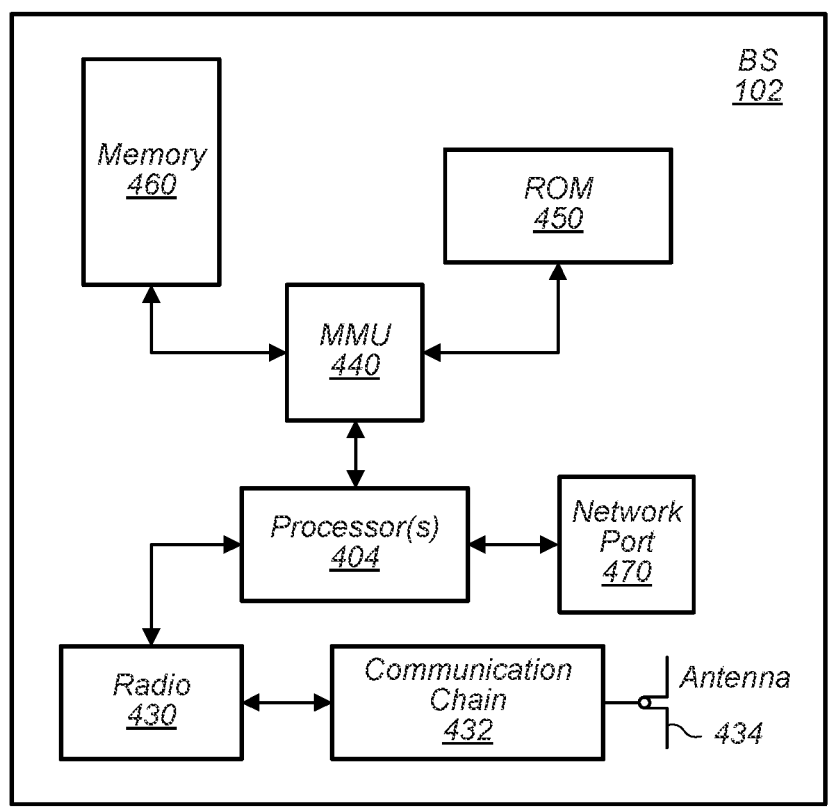
FIG. 4 illustrates an exemplary block diagram of a base station, according to some embodiments.

FIG. 4—Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device that may use an enhanced Type II CSI port selection codebook based at least on partial reciprocity during wireless communications, e.g. during 5G-NR communications. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for communicating with UE devices that use an enhanced Type II CSI port selection codebook based at least on partial reciprocity for enhanced channel state information reporting during wireless communications, e.g. during 5G-NR communications, as disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Type II Channel State Information (CSI) Reporting

In 3GPP new radio (NR, or 5G-NR) systems, two types of codebook, Type I codebook and Type II codebook, have been standardized for CSI feedback in support of advanced MIMO operations. The two types of codebook are constructed from a two-dimensional (2D) discrete Fourier transform (DFT) based grid of beams, enabling CSI feedback of beam selection and co-phase combining between two polarizations. Type II codebook based CSI feedback also reports the wideband and subband amplitude information of the selected beams, allowing for more accurate CSI to be obtained. This, in turn, provides improved precoded MIMO transmissions over the network.

Figure 6:
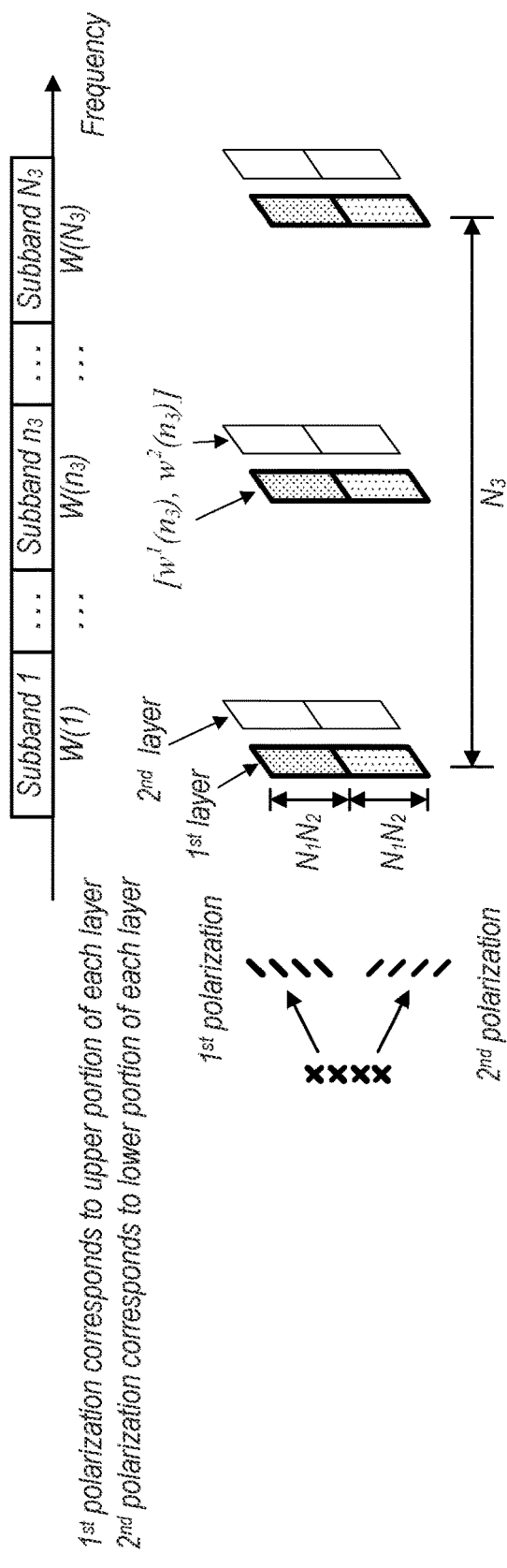
FIG. 6 shows an exemplary diagram illustrating a precoding structure associated with Type II CSI reporting, according to prior art.

FIG. 6 shows an exemplary diagram illustrating the precoding structure associated with Type II CSI reporting, according to prior art. The CSI may be reported to the base station (gNB) to indicate which precoding is preferred by the UE. As mentioned above, there are two types of codebooks for CSI reporting, or, worded differently, two types of CSI reporting, Type I and Type II. In Type II reporting, the precoding matrix is reported for each PMI subband, and is represented by a linear combination of a set of a specified number (L) of DFT vectors representing each column. As illustrated in FIG. 6, there may be a specified number ($N_3$) subbands, with a corresponding precoding matrix W for each subband. Each precoding matrix includes two columns, $w^1$ and $w^2$. Each column corresponds to the precoding vector for one layer. For each layer, the precoding vector may be further divided into two parts, a first polarization and second polarization. The L DFT vectors are common for all subbands and are used in subband-specific combinations. Specifically, each column vector is a weighted summation of the specified number (L) of vectors. The weighting (or combination) coefficients for the combination/combined weight are indicated in FIG. 6 by $c_0$, $c_1$, and $c_2$. As indicated in the example of FIG. 6, $v_0$, $v_1$, and $v_2$ represent three DFT vectors. The UE reports to the gNB, which three DFT vectors are preferred.

Figure 7:
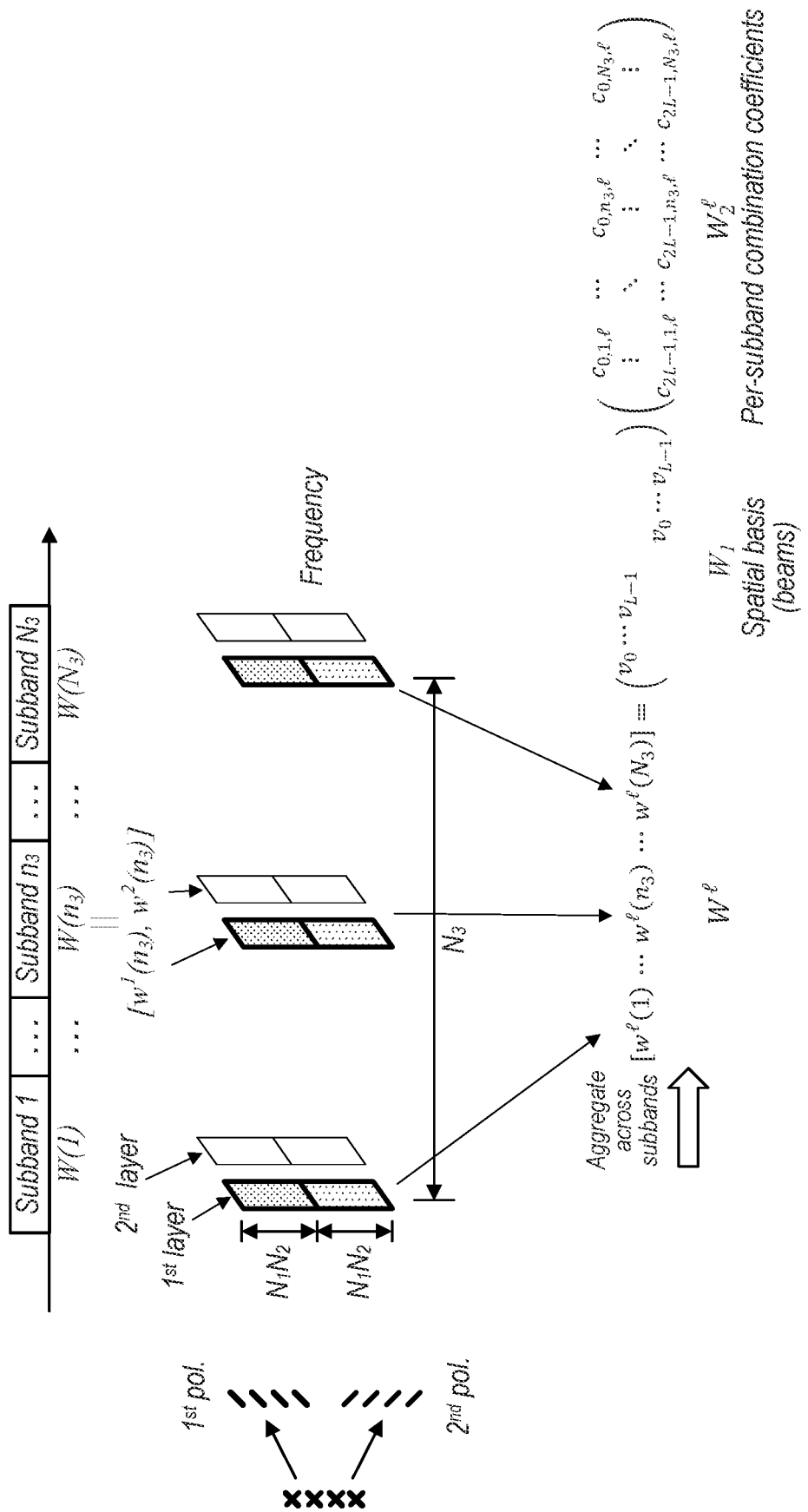
FIG. 7 shows, an exemplary diagram illustrating the reporting structure used by the UE to report back to a base station, according to prior art.

FIG. 7 shows an exemplary diagram illustrating the reporting structure used by the UE to report back to the base station (e.g. to the gNB), according to prior art. Each subband has its own corresponding set of combination coefficients, and eventually the UE needs to report all the combination coefficients. When considering the reporting by the UE, the Type II overhead is dominated by the subband combination coefficient. According to the information shown in FIG. 7, the total number of entries is $2L \times N_3$, there is one (1) bit for amplitude, and there are three (3) bits for phase. In a worst case scenario, there may be 19 subbands, 32 transmit (TX) ports, and a CSI payload size of more than 1000 bits.

Enhanced Codebook for Channel State Information (CSI) Port Selection

As previously indicated, in the 3GPP Rel-15 specification, beamformed CSI-RS (channel state information-reference signal) exploits DL (downlink) and UL (uplink) channel reciprocity for Type II Port Selection. A total number of "X" CSI-RS ports may be selected, specifically X/2 ports for horizontal polarization (HPol) and X/2 ports for vertical polarization (VPol). A number "L" of CSI-RS ports may be selected out of X/2 CSI-RS port, with the first CSI-RS port selected every number "d" of ports. Then consecutive L ports may be selected with wraparound. The 3GPP Rel-16 specification discloses the same port selection design as Rel-15, while adding certain features. For example, when subband PMI (precoding matrix index) is configured, frequency domain DFT matrix can be used to compress the linear combination coefficient. For Type II port selection codebook, the gNB is assumed to precode the CSI-RS based on channel reciprocity. E.g., the DL channel may be estimated based on the UL channel. For FDD (frequency division duplex), exact channel reciprocity may not be present, especially when the duplexing distance is large.

As indicated above, the use of channel reciprocity helps simplify Type II CSI-RS port selection design. The UL and DL channel may exhibit very similar channel characteristics, thus channel estimates performed for either UL or DL may be used for the complementary direction, (DL or UL). The base station, instead of merely transmitting the non-precoded CSI-RSs and querying the UE to report what the preferred beamforming vector is, may perform port selection so it can beamform the CSI-RSs and query the UE to indicate which CSI-RSs the UE prefers. The UE is allowed to indicate "L" CSI-RS ports, e.g. 2 or 4 ports. Only L consecutive ports may be indicated to keep signaling manageable. The indication "window" contains L consecutive CSI-RS ports. The starting point of the window may be flexible but subject to another parameter "d" in that the starting points have to be separated by a number "d" of CSI-RS ports. "d" may itself configurable (e.g. 1, 2, 3, or 4). In the worst case, only every forth CSI-RS port may represent the starting point of the window. Once the starting point of the window has been indicated, the next L CSI-RS ports may be reported.

There are clear limitations of how CSI ports are reported. The enhancements in 3GPP Rel-16 are quite limited, for example to compressing the linear combination coefficient of the frequency domain DFT matrix, as indicated in FIG. 8). As previously mentioned, the assumption pertaining to reciprocity is that the UL channel and DL channel may be similar, and only one direction (UL or DL) channel needs to be estimated, with the same estimation used for the other, complementary channel. For FDD, there may be a paired UL/DL carrier with a duplexing distance introduced to minimize the interference between UL and DL channels. As a result, there may not be channel reciprocity between UL and DL, especially when the duplexing distance is large. However, despite this the channels may still not be completely uncorrelated, and some reciprocity may be present. In other words, even for FDD partial reciprocity may exist. Two properties have been identified as being highly correlated between UL and DL, the angle of arrival or departure and channel delay profile. The former pertains to the angle of signal reflection, the latter itself is related to the signal reflection insofar that similarly reflected signals will experience similar delays. Potentially, even the delay power profile may be similar. Type II Port selection may be enhanced by accommodating this partial reciprocity for FDD designs. For example, compression may be made more efficient by using knowledge of channel delay and power profile, especially from the perspective of the base station (e.g. gNB), which may configure compression that is simpler for the UE. Overall, Type II CSI port selection may be enhanced by exploiting partial channel reciprocity, facilitating layer independent CSI-RS port selection, layer common CSI-RS port selection, frequency domain compression enhancement, and/or dynamic codebook parameter reconfiguration.

For improved CSI-RS transmission and CSI feedback or reporting, in some embodiments, based on an UL SRS transmitted by the UE to the base station (e.g. to a gNB), the gNB may estimate the UL channel and assume certain reciprocity of the channel to derive downlink (DL) channel properties, e.g. preferred beam(s). The base station may then transmit the CSI-RS precode with the preferred beam(s). The CSI-RS may have multiple CSI-RS ports, and each port may be transmitted from the base station using a different beam, i.e. each CSI-RS port may correspond to a different beam using which the CSI-RS port is transmitted. The UE may indicate to the base station the preferred CSI-RS port(s) via CSI reporting, e.g. indicate the preferred beam in an implicit way.

The base station may configure multiple frequency and time resources for a CSI-RS resource. For example, a CSI-RS resource may span up to 4 OFDM symbols and may occupy different resource elements (REs) in the frequency domain. A CSI-RS resource may have up to 32 ports, i.e., there may be patterns to create up to 32 ports within the same CSI-RS resource. The patterns may be orthogonal to each other to allow the UE to properly identify separate ports, e.g. to separate each port. When the gNB transmits CSI-RS port(s), the gNB may transmit up to 32 CSI-RS ports, and each CSI-RS port may be transmitted with (or using) a different beam (precoder). In a sense when the gNB transmits a CSI-RS resource, the gNB may be transmitting up to 32 ports with each port potentially being separately beamformed. The UE may separate different CSI-RS ports according to specified orthogonal patterns, enabling the UE to measure the quality of each CSI-RS port and determine which CSI-RS port(s) have the relative highest quality. It should be noted that a port, as used herein, is understood to be a logic concept as establish in the 3GPP specification. Accordingly, each port is configured or associated with certain resource allocations and certain patterns on how to transmit certain signals, for example how to transmit CSI-RSs. Resource(s) may be configured or allocated for a CSI-RS port, for example, the first 2 REs for each 6 REs in the frequency domain (an RE is the unit of subcarrier or tone in OFDM, and consecutive 4 symbols in the time domain.) Then, the pattern and how to generate the sequence for that particular port may be defined. For example, particular orthogonal patterns may be specified. Thus, transmission of a CSI-RS port may be interpreted as transmission of a CSI-RS according to a specific frequency domain and time domain resource configuration and orthogonal pattern. The UE may also have an indication of the same configuration of frequency and time resources and orthogonal pattern, allowing the UE to extract the corresponding signal(s) and measure the quality of each CSI-RS port. For example, for every 4 REs in the frequency domain, a gNB may transmit CSI-RS port 0, on the first RE, transmit CSI-RS port 1 on the second RE, transmit CSI-RS port 2 on the third RE, and transmit CSI-RS port 3, on the fourth RE. Each CSI-RS port may be transmitted with a different corresponding beam, i.e. with a different corresponding precoding. In short, "transmitting a CSI-RS port" may be interpreted as transmitting a CSI-RS according to a specific resource configuration, which may include frequency resources, time resources, and additional possible resource configuration(s), such as the use of orthogonal cover codes corresponding to an orthogonal pattern.

Layer Independent CSI-RS Port Selection

Figure 9:
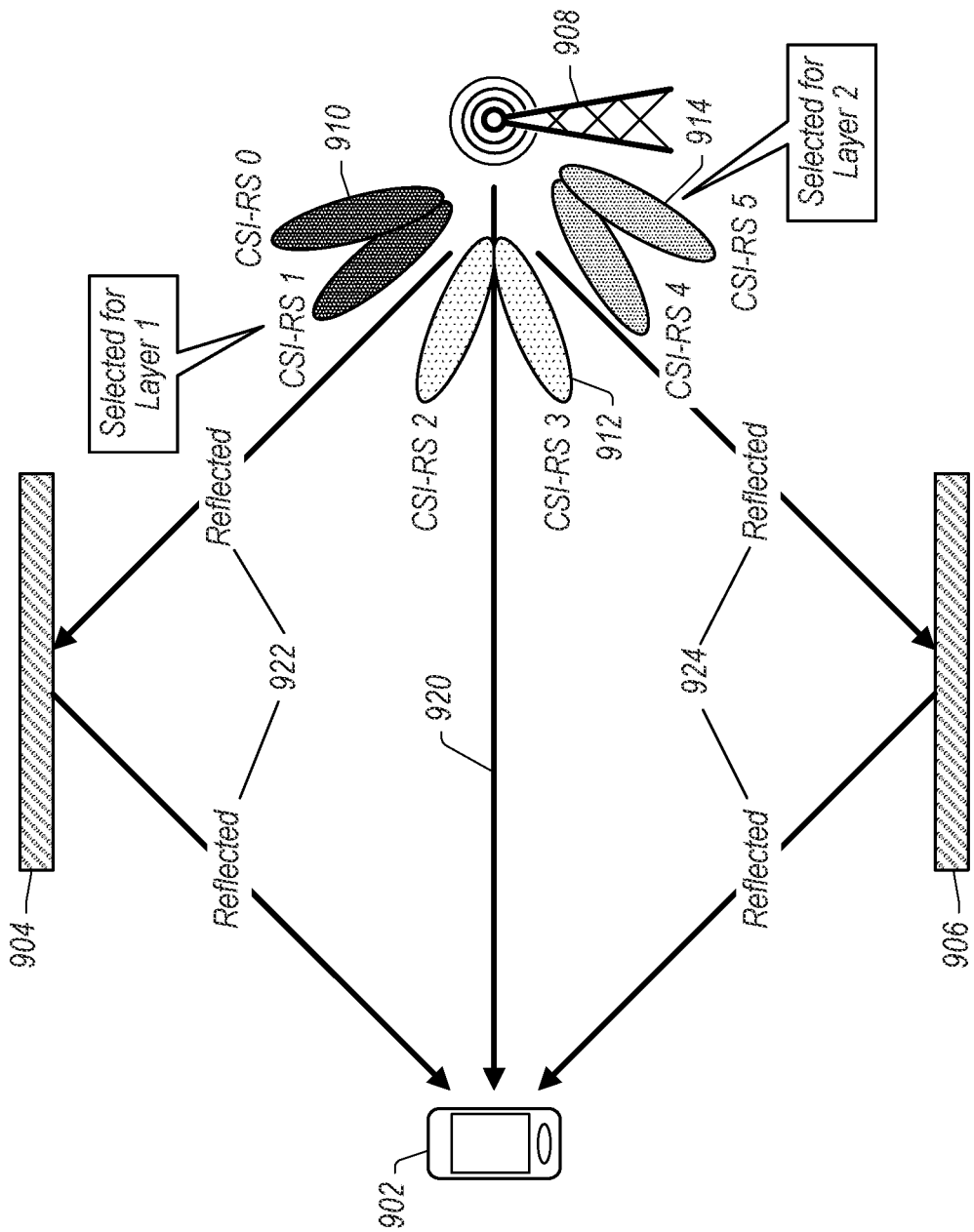
FIG. 9 shows an exemplary diagram illustrating layer independent CSI-RS port selection, according to some embodiments.

FIG. 9 shows an exemplary diagram illustrating layer independent CSI-RS port selection. Referring to FIG. 9, the signal between a transmitter 908 and receiver 902 may travel through three different signal paths. A line of sight signal path (920), and two reflected signal paths (922 and 924, respectively). The respective signals over the three signal paths may reach the receiver at the same time or at different times. The reflectors (904 and 906) may typically be the same for UL and DL (e.g. representing a stationary element/ structure). The base station 908 may detect the three paths during UL, e.g. it may detect that the strongest signals were received over paths 920, 922, and 924, and may also proceed to transmit (DL) across/along those same three paths. The angle(s) of the strongest beams may be assumed to be the same for UL and DL. There may thus be three channel directions with multiple beams (CSI-RS ports) associated with each direction. CSI-RS 0 and CSI-RS 1 correspond to signal path 922, CSI-RS 2 and CSI-RS 3 correspond to signal path 920, and CSI-RS 4 and CSI-RS 5 correspond to signal path 924. In the example shown in FIG. 9, the base station (e.g. gNB) 908 may identify two separate (candidate) beams (CSI-RS ports) and may select a preferred one of the two beams.

Considering the spatial basis, the beam may be common for the layer. That is, when reporting a multilayer (e.g. four-layer) transmission, every layer may share the same spatial basis. For example, when CSI-RS 0 is selected for layer 0, it may also be applied to (or selected for) layers 1, 2, and 3. However when the direction of the signal path is clearly known, it may be beneficial to indicate which specific CSI port(s) is(are) preferred independently of the layer(s). For example, when the UE and gNB support 3-layer transmission, there may be a dominant path, and path 922 may be selected by (for) layer 1, and path 924 may be selected for layer 2. In brief, the CSI-RS port selection may be performed independently for each layer.

According to one proposal, for each layer, only one CSI-RS port may be selected. The CSI-RS port may be indicated for one polarization, and the same index may be automatically used for the other polarization. The first number "X/2" of CSI-RS ports may correspond to the horizontal polarization (HPol) and the second number "X/2" of CSI-RS ports may correspond to the vertical polarization (VPol). The CSI-RS port with the same relative index may be selected for HPol and VPol.

According to another proposal, for each layer and for each PMI subband, before compression, only one linear combination coefficient is needed. For the HPol, no coefficient may be needed, e.g. it may be assumed to have a specific value. For the VPol, the phase and amplitude may be needed. In other words, two CSI-RS ports may be selected for each layer, a first port for HPol and second port for VPol. Not only the port but also the phase compensation that the gNB intends to use may be indicated to ensure multiple ports are combined coherently on the UE side.

According to yet another proposal, the CSI-RS port selected from among the X/2 CSI-RS ports may be indicated according to multiple options, still in a layer independent manner.

According to a first option, the UE may freely indicate which port to choose. In the example of FIG. 9, there are six ports, and any one of those six ports may be indicated. Three bits are required to indicate one out 6 of possible ports. This represents the most flexible design, essentially a completely free indication where $\lceil \log 2(X/2) \rceil$ bits may be needed per layer.

According to a second option, the X/2 CSI-RS ports may be divided in to e groups, each group with d CSI-RS ports. For example, the six ports shown in FIG. 9 are divided into three groups where each group corresponds to one of the signal paths as indicated (and previously noted above). Beam refinement (final selection) may be made within each respective group, with the corresponding path identified in the UL. So the group may be indicated, and then the specific beam within the group may be selected. That is, the preferred group and an offset within that group may be indicated to identify the port. The offsets may be the same for all layers, and only the groups may need to be independently indicated per layer. Tradeoff is between overhead (less flexibility with reduced overhead) and flexibility (increased flexibility with increased overhead). The offset within the group may be common among all the layers, indicated using $\lceil \log 2(d) \rceil$ bits. The index of which group is independently signaled per layer may be indicated using $\lceil \log 2(e) \rceil$ bits. For example, if e1 and e2 are signaled for layer 1 and 2, respectively, and d_c is for all layers, e1*d+d_c CSI-RS port is selected for layer1, and e2*d+d_c CSI-RS port is selected for layer2. The group index may be jointly coded across different layers to save overhead, using $\lceil \log 2(C^e_{RI}) \rceil$ bits where $C^e_{RI}$ is the number of possible RI selections of out of e, where RI is the number of layers.

Layer Common CSI-RS Port Selection

Figure 10:
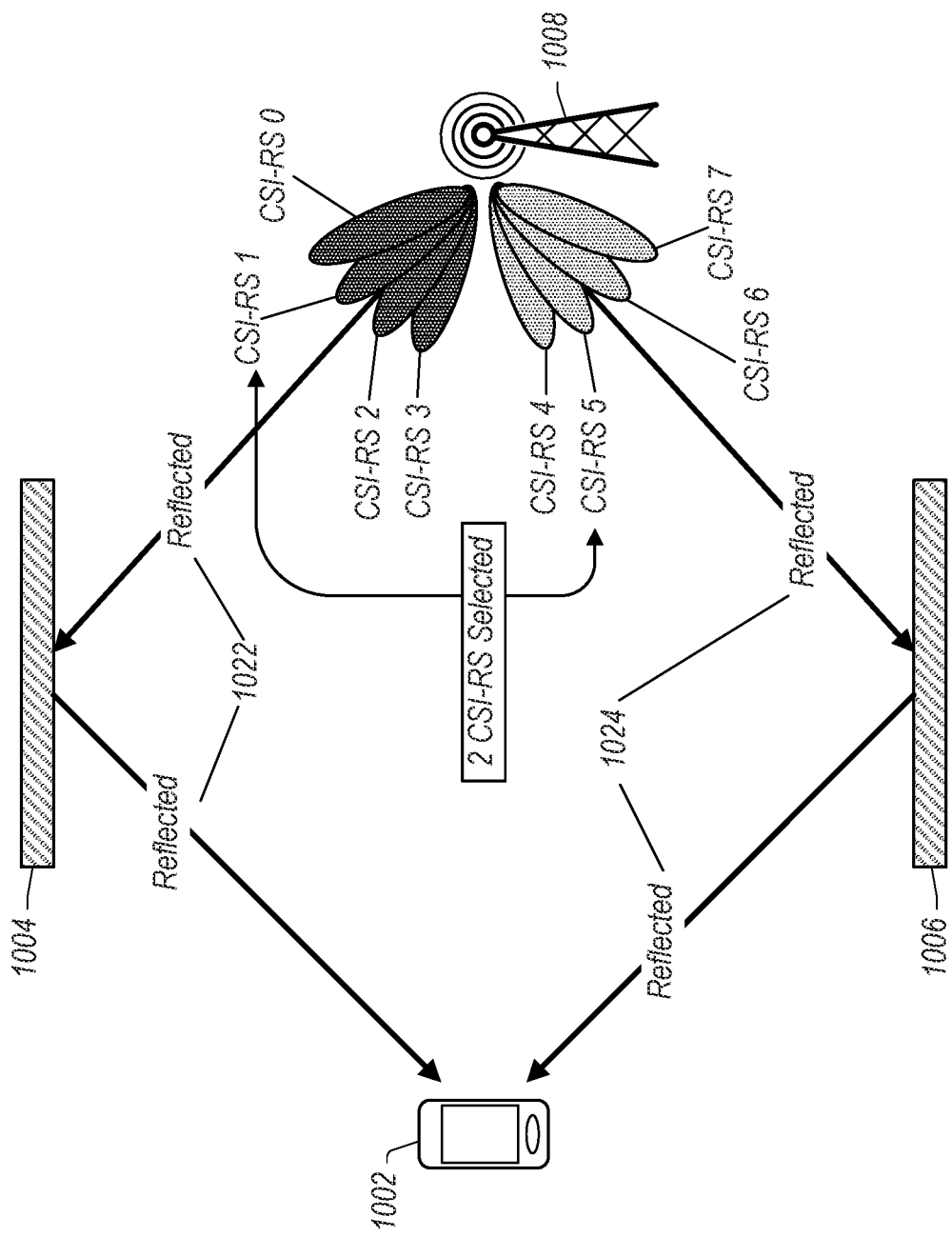
FIG. 10 shows an exemplary diagram illustrating layer common CSI-RS port selection, according to some embodiments.

FIG. 10 shows an exemplary diagram illustrating layer common CSI-RS port selection. For sake of simplicity only two signal paths 1022 and 1024 are shown (the line of sight signal path is not considered). Signal path 1022 is reflected off reflector 1004 between base station 1008 and UE 1002, while signal path 1024 is reflected off reflector 1006 between base station 1008 and UE 1002. In this case there are two groups of four possible ports each, respectively corresponding to the two different (reflected) signal paths 1022 and 1024. In this case the port selection may be common for each layer. A respective beam may be selected from each group, the first group including CSI-RS 0, CSI-RS 1, CSI-RS 2, and CSI-RS 3, and the second group including CSI-RS 4, CSI-RS 5, CSI-RS 6, and CSI-RS 7. For example, two CSI-RS ports may be selected from the two groups, and the beam(s) may be used for any single layer. Every single layer may be transmitted using any of the selected beams or using a linear combination of the selected beams.

In some embodiments, non-consecutive ports may be selected. In the example shown in FIG. 10, CSI-RS ports 1 and 5 may be selected. This provides flexibility for the UE to pair the beams instead of being limited by the ordering of the ports, e.g. by the order in which the ports are transmitted by the gNB. The CSI-RS port selection may be done jointly and may be common for each layer. L out of X/2 CSI-RS ports may be selected for HPol and VPol, and the CSI-RS ports with the same relative index may be selected for HPol and VPol.

The CSI-RS ports may be indicated according to multiple options.

According to a first option 1, the ports may be divided into groups, e.g. two groups may be selected. Within the groups, one CSI-RS port may be selected, and an offset may also be indicated. In the example shown in FIG. 10, the offset is 1, hence CSI-RS (port) 1 is selected from the top group (corresponding to signal path 1022) and CSI-RS (port) 5 is selected from the bottom group (corresponding to signal path 1024). More generally, the number "X/2" of CSI-RS ports may be divided into a number "e" of groups, each group with a number "d" of CSI-RS ports. The offset within the group may be common among all the layers, for example e=2 and d=4. A number "L" out of "e" groups may be selected using. $\lceil \log 2(C^e_L) \rceil$ bits. For each selected group, one CSI-RS may be selected. The relative index with the CSI-RS group may be the same, e.g. $\lceil \log 2(d) \rceil$ for all groups, or it may be independent, e.g. $\lceil \log 2(d) \rceil$ for each group.

According to a second option, a completely free indication may be provided using $\lceil \log 2(C_L^{X/2}) \rceil$ bits.

According to a third option, multiple ports may be reported within a group. For example, instead of reporting one port from a group (CSI-RS 1 in top group as in previous example), multiple ports from the group may be reported. Thus, the X/2 CSI-RS may be divided into a number "e" of groups, each group with a number "d" CSI-RS ports. The offset within the group may be common among all the layers, for example e=2 and d=4. A subset of groups may be selected, with a total number "L" out of X/2 CSI-RS ports selected. One, or more than one CSI-RS port may be chosen for each group, and the number of CSI-RS ports selected per group may be limited to be the same.

According to a fourth option, a subset of groups may be selected, which may be one group or more than one group. When a group is selected, all the CSI-RS ports within the group may be selected.

Frequency Domain Compression Enhancement

In 3GPP Rel-16, N3 refers to the number of subbands for PMI reporting. DFT compression is used to compress frequency domain coefficients. Only a number "M" out of a number "N3" of DFT bases are used. When N3<=19, M is chosen freely among N3 DFT bases. When N3>19, M is chosen within a 2M window. The location of the 2M window may be shifted up to 2M around the DC component.

Figure 11:
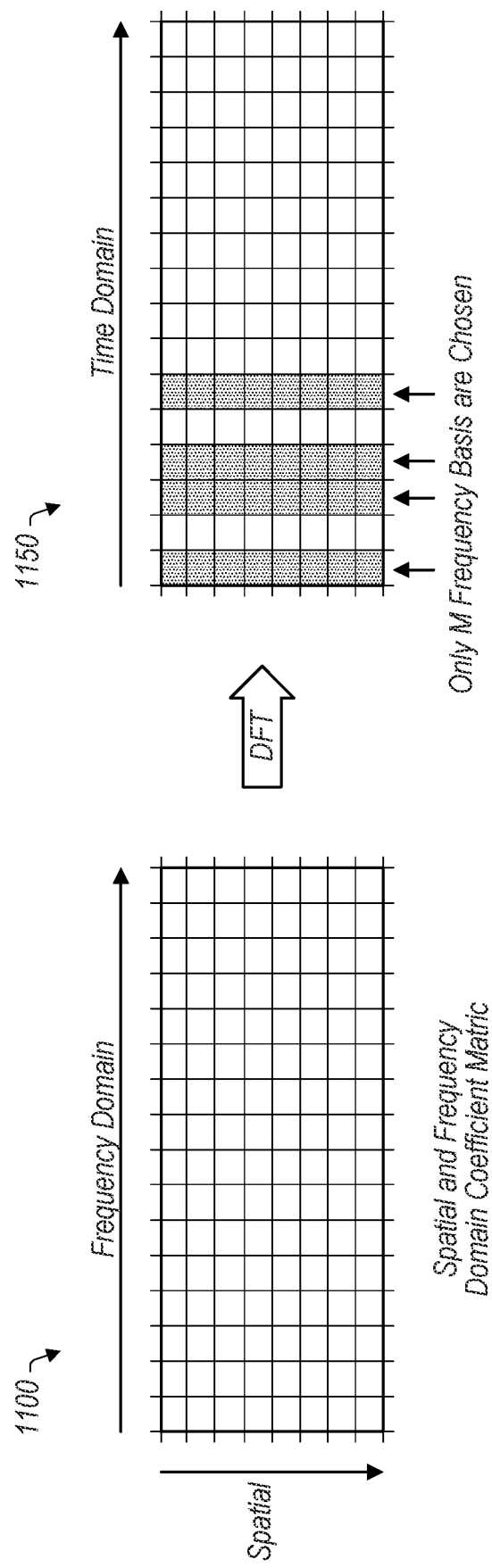
FIG. 11 shows an exemplary diagram illustrating frequency domain compression for CSI-RS port selection, according to some embodiments.

FIG. 11 shows an exemplary diagram illustrating frequency domain compression for CSI-RS port selection, according to some embodiments. The number of rows in matrix 1100 represent the spatial bases. For example, for L spatial bases there are 2L rows (L for each polarization). The number of columns represent the subband, for example up to 19 or 38 subbands to be reported. The example illustrates an 8×19 matrix (1100). Every column for this particular subband is a preferred linear combination among 8 spatial bases. The matrix is to be reported back to the gNB together with the spatial bases. The gNB then multiplies the matrix with the spatial bases to reconstruct the beam that the gNB will use for DL transmission.

One issue that may arise is the channel exhibiting a flat frequency characteristic. If the channel has a much shorter time span, then it may be fairly flat in frequency. If there is no multipath in the time domain then the channel delay profile may be very short and there may not be much frequency selectivity, for example every single frequency domain may contain the same/similar channels. If there are more multipaths in the time domain then there may be more selectivity in the frequency domain.

Delay reciprocity may be leveraged by considering how many multipaths the UL channel has and what the delay profile of the UL channel is. The delay profile may be very similar for UL and DL. The base station may be able to determine frequency selectivity on the DL based on the UL delay profile. DFT (of the matrix) from frequency domain to time domain allows for compression. In the example of FIG. 11, only columns 1, 3, 4, and 6 correspond to frequency bases with high energy (e.g. worth considering for transmissions), therefore the other frequency bases need not be considered. Thus, to provide further improvement, in some embodiments, the base station may not request information for the entire time domain. Once the base station has knowledge of the time domain pattern of the channel, it may help reduce overhead by instructing the UE to report a subset of the frequency bases, which after undergoing DFT represent different time domain taps.

In some embodiments, the base station may preconfigure the subset of DFT bases for coefficient compression according to multiple options. That is, the base station may indicate which taps (each tap represented by a column in matrix 1150) it prefers.

According to a first option, the bases station may provide a bitmap to indicate the DFT basis (or bases) that may be used for compression. For each enabled DFT basis, the base station may further configure the limitation on the amplitude that can be used. The same amplitude limit may apply to all the spatial bases and layers. The amplitude limit may apply to the amplitude average over all spatial bases within the same layer and/or over all spatial bases across all layers. Each coefficient may correspond to a spatial basis. The base station may indicate in the bitmap whether the UE is to provide an indication corresponding to a given tap. The base station may provide an indication to the UE regarding restrictions for the given taps, such as energy restricted within certain threshold, for example. The bitmap may be representative of which taps are to be turned on and off. For "on", additional restrictions may be indicated. E.g. the total energy corresponding to a given (selected/active) column may not exceed a specified threshold.

According to a second option, the base station may provide the window size for the DFT basis (or bases), e.g. the maximum delay spread. The windows may have an initial offset with respect to the DC component. The base station may further limit the basis selection within the window. Generally, once the base station has determined/obtained the delay profile of the channel and how to select the column (select the frequency basis), it may assist the UE in further reducing overhead.

Dynamic Codebook Parameter Reconfiguration

The codebook resolution and overhead depends on many factors for Type II CSI reporting. The configuration is mostly semi-statically configured in RRC per the current 3GPP Rel-15 and Rel-16 standard. When the Sounding Reference Signal (SRS) can provide partial reciprocity, the parameter may be dynamically configured for further base CSI reporting enhancement. The SRS is a reference signal transmitted by the UE in the uplink direction and is used by the base station to estimate the uplink channel quality over a wider bandwidth. The base station may use this information for uplink frequency selective scheduling. When SRS provides partial reciprocity based CSI report enhancement, dynamic configuration of the parameters may provide additional advantages. Thus, as opposed to configuring the parameters semi-statically via RRC, they may be dynamically configured in response to indication(s) received by the UE from the base station. For example, the base station may determine that the channel has become very directional and may instruct UE to report a reduced number of spatial bases with respect to possible available spatial bases. The dynamic configuration may be achieved through MAC-CE or L1 DCI. The configured parameters may include angle related parameters, e.g. the number of spatial bases selected. They may further include delay related parameters, e.g. the number of frequency bases selected, the number of non-zero coefficients, and/or the PMI oversampling factor (e.g. 1 or 2).

Layer Common CSI-RS Port Selection Examples

In some embodiments, downlink CSI may be derived from uplink transmissions, e.g. with SRS for FDD systems. For an FDD system, due to the duplex separation between DL and UL, many parameters for the propagation channels (DL and UL) can be considered independent, but some other parameters may be treated as correlated, for example angle of departure and the delay profile at the base station (e.g. gNB), which may provide an opportunity for the gNB to derive useful information concerning DL from the received UL signal, e.g. SRS or DMRS of PUSCH/PUCCH or PRACH or even UL channels such as PUSCH or PUCCH.

Similar to the situation for TDD, due to various reasons, e.g. power consumption, form factor, etc., a UE may have more DL antennas than UL antennas, hence for a FDD system, besides duplex separation, the imparity between DL and UL antenna numbers may lead to further obstacles in deriving DL CSI from UL transmission(s).

One feasible approach is for the gNB to derive the angle of departure and delay profile from UL observations over UL signals, e.g. identifying orthogonal DFT beams at the UL frequency with significant power, then applying the necessary carrier frequency adjustment to orthogonal DFT beams at the DL frequency. It may also be possible for the gNB to implement a proprietary algorithm which may be applied to the UL observations to obtain the DL precoding vectors for CSI-RS. Hence if a solution which does not depend on any special structure in the precoder for CSI-RS is available, then it may be applicable to broad scenarios.

In 3GPP Rel-15 and 3GPP Rel-16, for Type II port selection codebook design the port selection is through a number of neighboring CSI-RS ports, and is wideband. Considering the above, and further considering that the overhead due to wideband signaling may present a less serious issue than that due to subband signaling in CSI feedback, free antenna port selection may be used.

Instead of using $i_{1,1}$ to select ports $\{i_{1,1} \times d+0, i_{1,1} \times d+1, \ldots, i_{1,1} \times d-L-1\}$ and $\{P_{CSI-RS}/2+i_{1,1} \times d+0, P_{CSI-RS}/2+i_{1,1} \times d+1, \ldots, P_{CSI-RS}/2+i_{1,1} \times d-L-1\}$, where d is the parameter configured by the gNB, and $P_{CSI-RS}$ is the number of CSI-RS ports configured for the port selection codebook, L ports from among $P_{CSI-RS}/2$ ports may be chosen, presumably for polarization 0. The selected port indices are given by $\{S_{0,0}, S_{0,1}, \ldots, S_{0,L-1}\}$, and $S_{0,0} < S_{0,1} < \ldots < S_{0,L-1}$, and the same port selection is applied to polarization 1 (presumably): $\{S_{1,0}, S_{1,1}, \ldots, S_{1,L-1}\} = \{P_{CSI-RS}/2+S_{0,0}, P_{CSI-RS}/2+S_{0,1}, \ldots, P_{CSI-RS}/2+S_{0,L-1}\}$.

Depending on the precoders applied to the CSI-RS, the gNB may select different numbers of CSI-RS ports for different polarizations: e.g. three ports for the +45° polarization, and five ports for −45° polarization, hence ports may also be selected from among all CSI-RS ports.

In some embodiments, port selection may freely be conducted over all $P_{CSI-RS}$ ports, e.g. 2L out of $P_{CSI-RS}$ ports may be selected. Combinatorial indexing (as also defined in 3GPP Rel-15 and 3GPP Rel-16) may be used. Alternatively, a $P_{CSI-RS}$ bit bitmap or $P_{CSI-RS}/2$ bit bitmap can be used to indicate the selection of ports, e.g. with $P_{CSI-RS}$=8, a 8 bit bitmap [0011 10 01] signifies ports 2, 3, 4, 7 are selected, and a 4 bit bitmap [01 01] signifies ports 1, 3, 5, 7 are selected.

Figure 13:
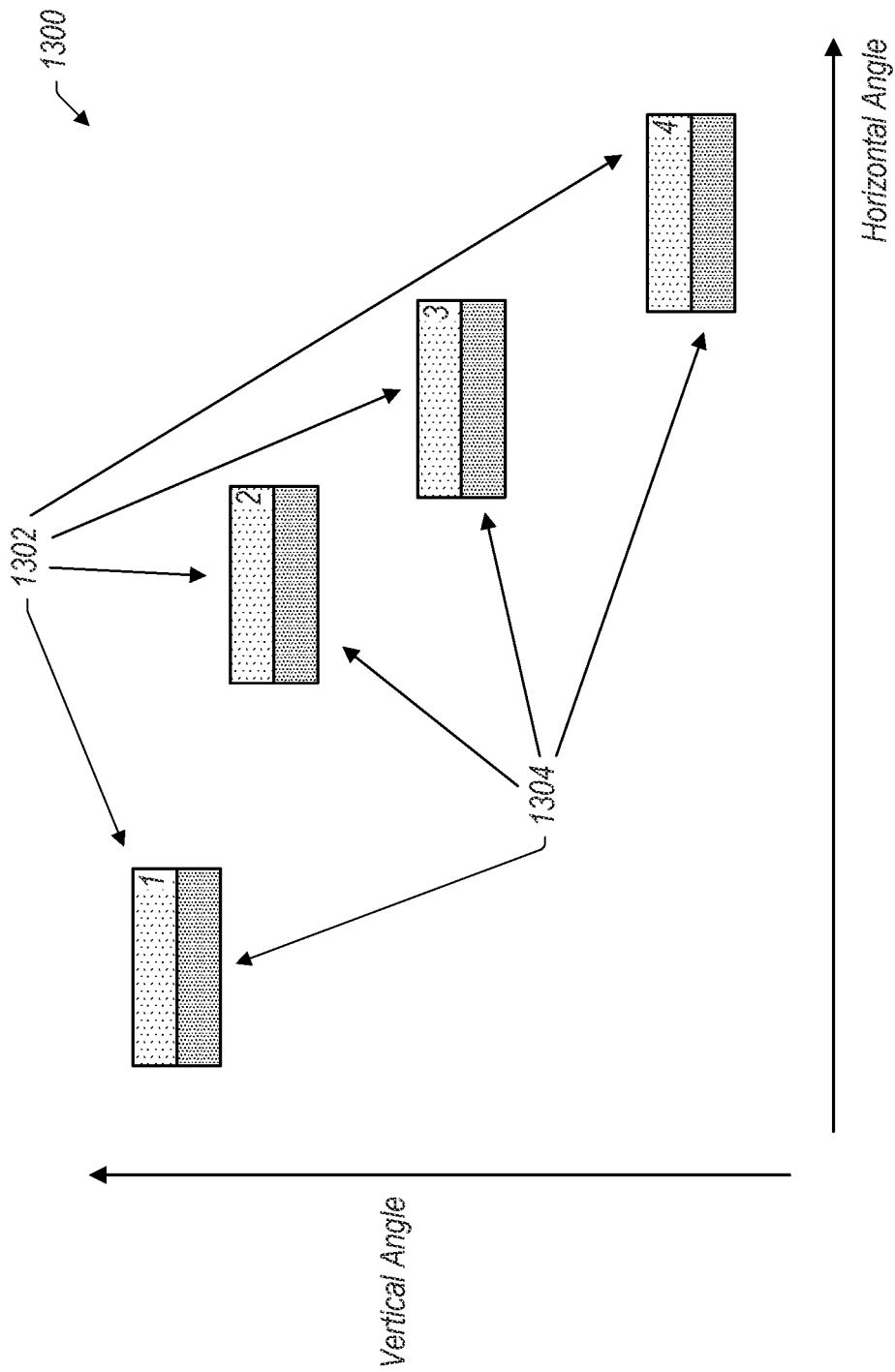
FIG. 13 shows an exemplary diagram illustrating antenna group selection for layer common CSI-RS port selection, according to some embodiments.

It is also possible that due to difference in UL and DL channel propagation, the DL channel information derived from the UL channel may not match the actual DL channel information. To tackle that, the gNB may choose to use one or more beam groups in the neighbor of the beam group derived from the UL channel, and precode all of them for the UE to test. In such a case the UE may feed back both the beam group index, and the port selection with the selected beam group. Assuming a beam group is mapped to Q CSI-RS ports, and there being G beam groups in total—e.g. the first Q CSI-RS ports for beam group 1, and the second Q CSI-RS ports for beam group 2—the UE may feed back the beam group index (1 or 2 in the example), and a bitmap for the selected ports in selected beam group. In FIG. 13, two beam groups (1302 and 1304) are shown, so G=2, Q=4. Within each beam group, there are Q beams. If, for example, the UE selects the 1302 beam, the bitmap [1001] may select beams 1 and 4 from the 1302 beam group.

Referring again to FIG. 10, the CSI-RS port selection may be done jointly and may be common for each layer. A number "L" out of X/2 CSI-RS ports may be selected for HPol and VPol. The CSI-RS ports with the same relative index may be selected for HPol and V-Pol. The signaling overhead may be $\lceil \log 2(C_L^{X/2}) \rceil$ bits. In the example shown in FIG. 10, X=8, and selection of port 0 from the top group may be coupled with selection of port 5 from the bottom group, and selection of port 1 from the top group may be coupled with selection of port 6 from the bottom group.

Figure 12:
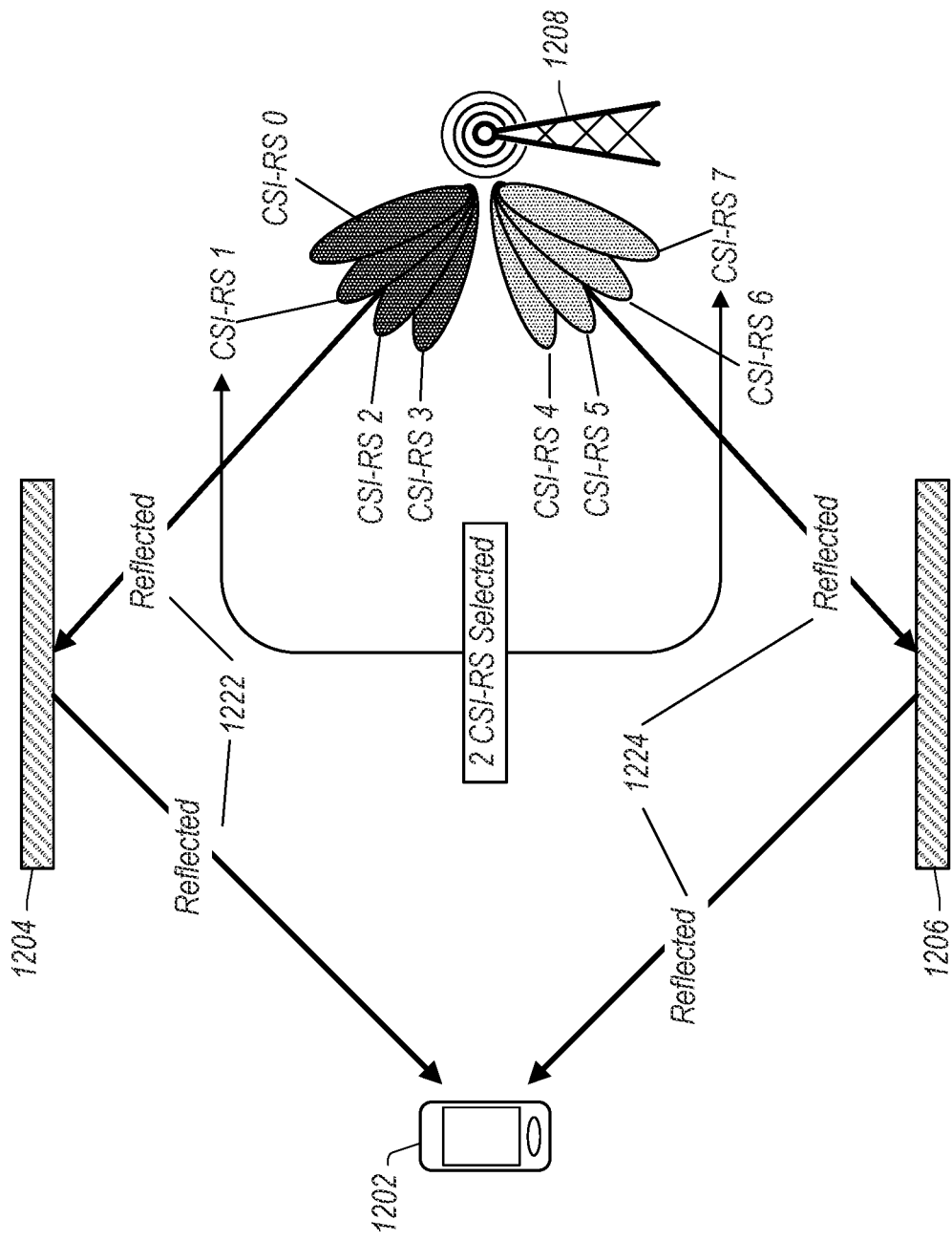
FIG. 12 shows an exemplary diagram illustrating layer common CSI-RS port selection using completely free indication, according to some embodiments.

FIG. 12 shows an exemplary diagram illustrating layer common CSI-RS port selection using completely free indication. For sake of simplicity only two signal paths 1222 and 1224 are shown (the line of sight signal path is not considered). Signal path 1222 is reflected off reflector 1204 between base station 1208 and UE 1202, while signal path 1224 is reflected off reflector 1206 between base station 1208 and UE 1202. In this case there are two groups of four possible ports each, respectively corresponding to the two different (reflected) signal paths 1222 and 1224. In this case the port selection may be common for each layer. A respective beam may be selected from each group, the first group including CSI-RS 0, CSI-RS 1, CSI-RS 2, and CSI-RS 3, and the second group including CSI-RS 4, CSI-RS 5, CSI-RS 6, and CSI-RS 7. For example, two CSI-RS ports may be selected from the two groups, and the beam(s) may be used for any single layer. Every single layer may be transmitted using any of the selected beams or using a linear combination of the selected beams. In the example shown in FIG. 12, CSI-RS 1 is selected from the top group, while CSI-RS 7 is selected from the bottom group, which suggests that selection of the CSI-RS ports is completely free, and the ports may be indicated to the UE using $\lceil \log 2(C_L^X) \rceil$ bits.

Antenna group selection may be combined with either approach described above. FIG. 13 shows an exemplary diagram illustrating antenna group selection for layer common CSI-RS port selection, as previously referenced above. In the example illustrated in FIG. 13, X=32, X'=8, e=4. The number "X" of CSI-RSs may be divided in to a number "e" of groups, each group with X' CSI-RS ports. One of the groups may be selected, with a total number "L" out of X' CSI-RS ports selected. One CSI-RS port or more than one CSI-RS port may be chosen for each group. The number of CSI-RS ports selected per group may be determined according to either approach discussed above. If the gNB bases decisions on the observed beams (1304—DL), then under certain conditions there may be a mismatch between UL and DL. As a safety measure, it is possible for the gNB to configure two beam groups. A first beam group (1302) and a second beam group (1304). UE may select a beam group, e.g. 1302, and may take the necessary steps to select the ports. In the example in FIG. 13, if X is the total number of antenna ports, e is the number of beam groups, and X is the number of CSI ports per beam group, then e=2 and X'=4.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
identifying, by a base station, dominant signal paths between the base station and a device, based on channel estimates performed using uplink communications between the base station and the device;
transmitting, by the base station to the device over corresponding beams identified independently by the base station for each dominant signal path of the dominant signal paths, a set of channel state information reference signals (CSI-RSs), wherein each CSI-RS of the set of CSI-RSs is transmitted according to a respective specific resource configuration that corresponds to a respective CSI-RS port of a set of CSI-RS ports, wherein each respective CSI-RS port corresponds to a respective beam associated with a corresponding dominant signal path of the dominant signal paths; and
receiving, by the base station from the device, information indicative of a subset of the set of CSI-RS ports selected by the device from among the set of CSI-RS ports and to be used for each layer of a multilayer transmission.

2. The method of claim 1,
wherein the subset of the set of CSI-RS ports is selected independently for each layer of the multilayer transmission or in common for each layer of the multilayer transmission.

3. The method of claim 2, wherein a single respective CSI-RS port is selected for each layer of the multilayer transmission.

4. The method of claim 3, wherein the single respective CSI-RS port is for a first polarization, and a same index corresponding to the single CSI-RS port is automatically used for a second polarization.

5. The method of claim 1, wherein two respective CSI-RS ports are selected for each layer of the multilayer transmission.

6. The method of claim 5, wherein a first of the two respective CSI-RS ports is for a first polarization and a second of the two respective CSI-RS ports is for a second polarization.

7. The method of claim 1, further comprising:
identifying a respective plurality of candidate CSI-RS ports for each dominant signal path of the dominant signal paths; and
selecting respective preferred CSI-RS ports of the respective plurality of candidate CSI-RS ports for each dominant signal path;
wherein the set of CSI-ports comprises the selected respective preferred CSI-RS ports.

8. An apparatus comprising:
processing circuitry configured to:
cause reception, at a device over corresponding beams identified independently by a base station for each dominant signal path of dominant signal paths between the base station and the device, of a set of channel state information reference signals (CSI-RSs), wherein each CSI-RS of the set of CSI-RSs is transmitted according to a respective specific resource configuration that corresponds to a respective CSI-RS port of a set of CSI-RS ports, wherein each respective CSI-RS port corresponds to a respective beam associated with a corresponding dominant signal path of the dominant signal paths, wherein the dominant signal paths are identified based on channel estimates performed using uplink communications between the base station and the device; and
cause transmission, by the device to the base station, of information indicative of a subset of the CSI-RS ports selected from among the set of CSI-RS ports by the device and to be used for each layer of a multilayer transmission.

9. The apparatus of claim 8, wherein the subset of the set of CSI-RS ports is selected independently for each layer of the multilayer transmission or in common for each layer of the multilayer transmission.

10. The apparatus of claim 9, wherein a single respective CSI-RS port is selected for each layer of the multilayer transmission.

11. The apparatus of claim 10, wherein the single respective CSI-RS port is for a first polarization and a same index corresponding to the single CSI-RS port is automatically used for a second polarization.

12. The apparatus of claim 8, wherein two respective CSI-RS ports are selected for each layer of the multilayer transmission.

13. The apparatus of claim 12, wherein a first of the two respective CSI-RS ports is for a first polarization and a second of the two respective CSI-RS ports is for a second polarization.

14. An apparatus comprising:
processing circuitry configured to:
identify dominant signal paths between a base station and a device based on channel estimates performed using uplink communications between the base station and the device;
cause transmission, to the device over corresponding beams identified independently by the base station for each dominant signal path of the dominant signal paths, of a set of channel state information reference signals (CSI-RSs), wherein each CSI-RS of the set of CSI-RSs is transmitted according to a respective specific resource configuration that corresponds to a respective CSI-RS port of a set of CSI-RS ports, wherein each respective CSI-RS port corresponds to a respective beam associated with a corresponding dominant signal path of the dominant signal paths; and cause reception, at the base station, of information indicative of a subset of the set of CSI-RS ports selected by the device from among the set of CSI-RS ports and to be used for each layer of a multilayer transmission.

15. The apparatus of claim 14, wherein the subset of the set of CSI-RS ports is selected independently for each layer of the multilayer transmission or in common for each layer of the multilayer transmission.

16. The apparatus of claim 15, wherein a single respective CSI-RS port is selected for each layer of the multilayer transmission.

17. The apparatus of claim 16, wherein the single respective CSI-RS port is for a first polarization and a same index corresponding to the single CSI-RS port is automatically used for a second polarization.

18. The apparatus of claim 14, wherein two respective CSI-RS ports are selected for each layer of the multilayer transmission.

19. The apparatus of claim 18, wherein a first of the two respective CSI-RS ports is for a first polarization and a second of the two respective CSI-RS ports is for a second polarization.

20. The apparatus of claim 14, wherein the processing circuitry is further configured to:
  identify a respective plurality of candidate CSI-RS ports for each dominant signal path of the dominant signal paths; and
  select respective preferred CSI-RS ports of the respective plurality of candidate CSI-RS ports for each dominant signal path;
  wherein the set of CSI-RS ports comprises the selected respective preferred CSI-RS ports.

* * * * *